(12) United States Patent
Mamtani et al.

(10) Patent No.: US 10,306,021 B1
(45) Date of Patent: May 28, 2019

(54) STREAMING CONTENT TO MULTIPLE CLIENTS

(71) Applicant: Amazon Technologies, Inc., Reno, NV (US)

(72) Inventors: Vinod Murli Mamtani, Bellevue, WA (US); Mark Kalman, Alameda, CA (US)

(73) Assignee: Amazon Technologies, Inc., Reno, NV (US)

( * ) Notice: Subject to any disclaimer, the term of this patent is extended or adjusted under 35 U.S.C. 154(b) by 436 days.

(21) Appl. No.: 14/464,755

(22) Filed: Aug. 21, 2014

(51) Int. Cl.
H04L 29/06 (2006.01)
G06F 3/0481 (2013.01)

(52) U.S. Cl.
CPC ............ *H04L 67/42* (2013.01); *G06F 3/0481* (2013.01); *H04L 65/60* (2013.01)

(58) Field of Classification Search
CPC ........ H04L 67/42; H04L 65/60; G06F 3/0481
USPC ........................................................ 709/228
See application file for complete search history.

(56) References Cited

U.S. PATENT DOCUMENTS

| | | | |
|---|---|---|---|
| 6,757,796 B1 * | 6/2004 | Hofmann | H04L 12/1827 348/E5.008 |
| 7,934,239 B1 * | 4/2011 | Dagman | H04N 21/234336 725/102 |
| 8,904,022 B1 * | 12/2014 | King | H04N 21/6408 709/219 |
| 2004/0015995 A1 * | 1/2004 | Shao | H04N 7/17318 725/87 |
| 2004/0236863 A1 * | 11/2004 | Shen | H04L 29/06027 709/231 |
| 2005/0010674 A1 * | 1/2005 | Taniguchi | H04L 29/06 709/231 |
| 2005/0166135 A1 * | 7/2005 | Burke | G11B 27/10 715/203 |
| 2005/0216559 A1 * | 9/2005 | Manion | H04L 67/104 709/205 |
| 2006/0168104 A1 * | 7/2006 | Shimizu | G06F 17/30017 709/218 |
| 2007/0204067 A1 * | 8/2007 | Walker | H04N 19/196 709/247 |
| 2008/0243996 A1 * | 10/2008 | Wu | H04L 65/608 709/203 |
| 2009/0089842 A1 * | 4/2009 | Perry | H04W 72/005 725/78 |
| 2009/0248872 A1 * | 10/2009 | Luzzatti | H04L 29/06027 709/226 |
| 2010/0293598 A1 * | 11/2010 | Collart | G06F 17/30056 726/3 |
| 2011/0231569 A1 * | 9/2011 | Luby | H04N 21/23106 709/234 |

(Continued)

*Primary Examiner* — Philip J Chea
*Assistant Examiner* — Wing Ma
(74) *Attorney, Agent, or Firm* — BakerHostetler

(57) ABSTRACT

Techniques for streaming content, such as a video game or whiteboard application, to multiple different clients are described herein. In some cases, differences may exist between characteristics of the different clients such as screen size, resolution, operating system, processors and memories and others. The different clients may be positioned in close proximity to one another or at remote locations with respect to one another. In some cases, different network conditions, such as available bandwidth, loss rates, latency, throughput and others, may exist for transmitting content to the different clients.

20 Claims, 6 Drawing Sheets

(56) References Cited

U.S. PATENT DOCUMENTS

| | | | |
|---|---|---|---|
| 2011/0238789 A1* | 9/2011 | Luby | H04N 21/23106 709/219 |
| 2011/0239078 A1* | 9/2011 | Luby | H04N 21/23106 714/752 |
| 2011/0246761 A1* | 10/2011 | Alexandrov | H04L 9/00 713/150 |
| 2012/0117200 A1* | 5/2012 | Millington | H04J 3/0664 709/219 |
| 2012/0233644 A1* | 9/2012 | Rao | H04M 1/7253 725/62 |
| 2012/0324519 A1* | 12/2012 | Laughlin | H04N 21/23439 725/95 |
| 2013/0007819 A1* | 1/2013 | Choi | H04N 7/147 725/88 |
| 2013/0067116 A1* | 3/2013 | Ostergren | H04L 65/604 709/248 |
| 2013/0251329 A1* | 9/2013 | McCoy | H04N 21/654 386/201 |
| 2014/0368734 A1* | 12/2014 | Hoffert | H04N 5/44591 348/564 |
| 2015/0092947 A1* | 4/2015 | Gossain | H04R 29/00 381/58 |
| 2015/0103680 A1* | 4/2015 | Anand | H04W 72/1231 370/252 |
| 2015/0120953 A1* | 4/2015 | Crowe | H04L 65/60 709/231 |
| 2015/0201023 A1* | 7/2015 | Kotab | H04L 65/60 709/208 |
| 2015/0217199 A1* | 8/2015 | Cotter | A63F 13/86 463/31 |
| 2016/0156950 A1* | 6/2016 | Bangma | H04N 21/4263 725/116 |
| 2016/0357499 A1* | 12/2016 | Millington | H04J 3/0664 |

* cited by examiner

STREAMING CONTENT TO MULTIPLE CLIENTS

BACKGROUND

Recent technological advances are allowing large numbers of users to interact with different content items using a variety of different devices with different capabilities. For example, multiple different users, possibly at different remote locations with respect to one another, may interact together with respect to content items, such as multiplayer video games and whiteboard applications. In some cases, differences may exist between characteristics of the different devices such as screen size, resolution, operating system, processors and memories and others. Also, in some cases, differences may exist between various users with respect to their ability to control various aspects of execution of the content. For example, some applications may sometimes be presented to different users in either a participant mode or a spectator mode. Users in the participant mode may have the ability to actively control execution of the content, while users in the spectator mode may merely observe execution of the content as opposed to actively controlling it. Furthermore, in some cases, a particular user may employ multiple different devices to interact with content. For example, content may sometimes be displayed on a television or other large display devices while also being controlled by an interface on another device such as a mobile device. For these and other reasons, it may be advantageous to provide techniques for delivering content to different devices in an efficient and reliable manner.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Techniques for streaming content, such as a video game or whiteboard application, to multiple different clients are described herein. In some cases, differences may exist between characteristics of the different clients such as screen size, resolution, operating system, processors and memories and others. The different clients may be positioned in close proximity to one another or at remote locations with respect to one another. In some cases, different network conditions such as available bandwidth, loss rates, latency, throughput and others may exist for transmitting content to the different clients. User input associated with the displayed content item may be provided by none, some or all of the different clients. In some cases, content may be transmitted to each of the different clients based, at least in part, on different transmission conditions such as different device characteristics, different network conditions and others.

In some cases, content may be transmitted to a first client, which may present the content and which may also forward the content to a second client. The first client may include, for example, a television or other larger screen display, while the second client may be, for example, a mobile device with a smaller screen display. In some cases, the second client may include a soft controller interface that receives user input for controlling execution of the presented content. The user input may, for example, be returned from the second client to the first client, which may relay the user input back to a content provider. In some cases, at least a portion of the content may be displayed simultaneously by both the first client and the second client. The first client may, for example, determine an estimated time at which the at least portion of the content is expected to be presented by the second client and delay presentation of the content until the estimated time.

Figure 1:
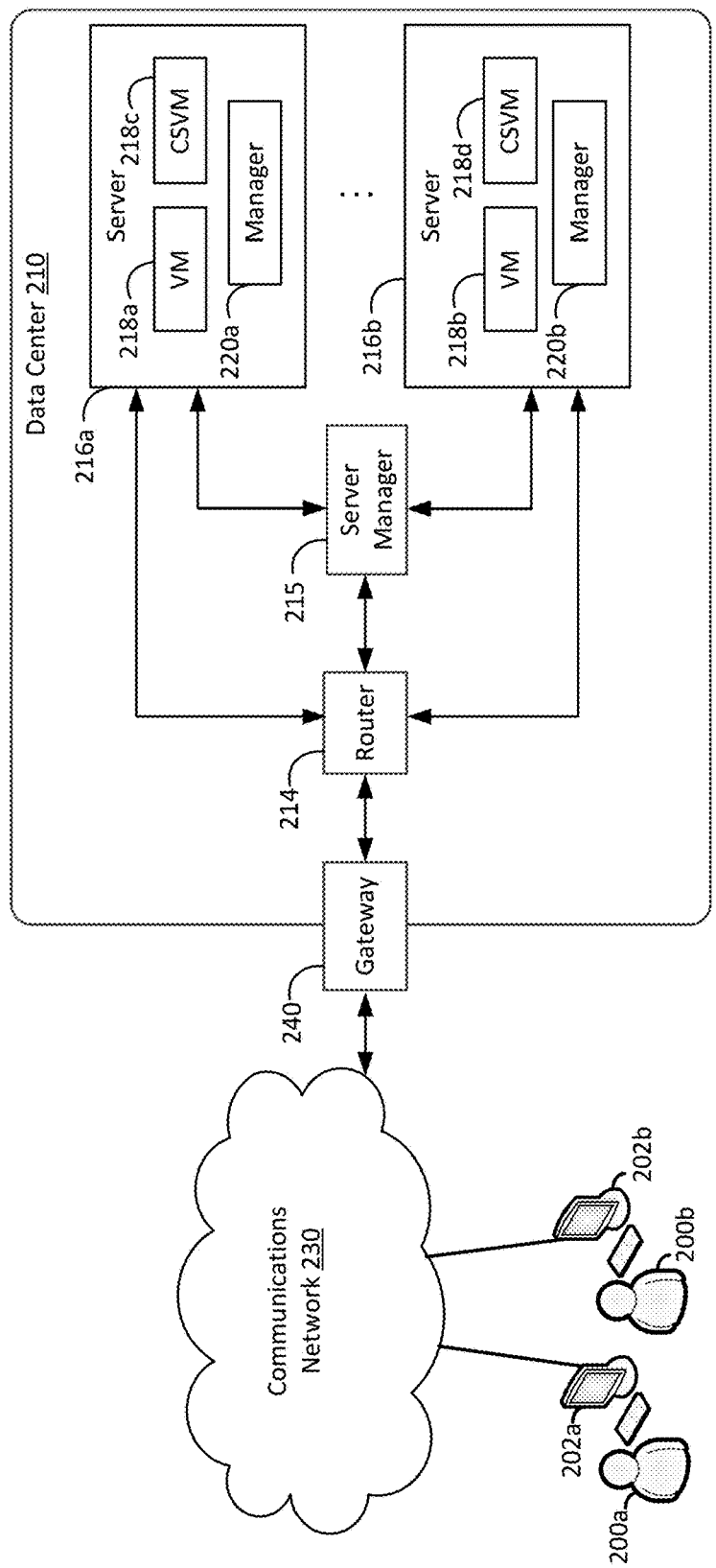
FIG. 1 is a diagram illustrating an example computing system that may be used in accordance with the present disclosure.

A content provider may, in some cases, render and transmit content to clients over an electronic network, such as the Internet. An example computing environment that enables rendering and transmission of content to clients will now be described in detail. In particular, FIG. 1 illustrates an example computing environment in which the embodiments described herein may be implemented. FIG. 1 is a diagram schematically illustrating an example of a data center 210 that can provide computing resources to users 200a and 200b (which may be referred herein singularly as user 200 or in the plural as users 200) via user computers 202a and 202b (which may be referred herein singularly as computer 202 or in the plural as computers 202) via a communications network 230. Data center 210 may be configured to provide computing resources for executing applications on a permanent or an as-needed basis. The computing resources provided by data center 210 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 210 may include servers 216a and 216b (which may be referred herein singularly as server 216 or in the plural as servers 216) that provide computing resources. These resources may be available as bare metal resources or as virtual machine instances 218a-d (which may be referred herein singularly as virtual machine instance 218 or in the plural as virtual machine instances 218). Virtual machine instances 218c and 218d are content streaming virtual machine ("CSVM") instances. The CSVM virtual machine instances 218c and 218d may be configured to perform all or any portion of the content streaming techniques and/or any other of the disclosed techniques in accordance with the present disclosure and described in detail below. As should be appreciated, while the particular example illustrated in FIG. 1 includes one CSVM virtual machine in each server, this is merely an example. A server may include more than one CSVM virtual machine or may not include any CSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 1, communications network 230 may, for example, be a publicly accessible network of linked networks and possibly operated by various distinct parties, such as the Internet. In other embodiments, communications network 230 may be a private network, such as a corporate or university network that is wholly or partially inaccessible to non-privileged users. In still other embodiments, communications network 230 may include one or more private networks with access to and/or from the Internet.

Communication network 230 may provide access to computers 202. User computers 202 may be computers utilized by users 200 or other customers of data center 210. For instance, user computer 202a or 202b may be a server, a desktop or laptop personal computer, a tablet computer, a wireless telephone, a personal digital assistant (PDA), an e-book reader, a game console, a set-top box or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

User computers 202 may also be utilized to configure aspects of the computing resources provided by data center 210. In this regard, data center 210 might provide a gateway or web interface through which aspects of its operation may be configured through the use of a web browser application program executing on user computer 202. Alternately, a stand-alone application program executing on user computer 202 might access an application programming interface (API) exposed by data center 210 for performing the configuration operations. Other mechanisms for configuring the operation of various web services available at data center 210 might also be utilized.

Servers 216 shown in FIG. 1 may be standard servers configured appropriately for providing the computing resources described above and may provide computing resources for executing one or more web services and/or applications. In one embodiment, the computing resources may be virtual machine instances 218. In the example of virtual machine instances, each of the servers 216 may be configured to execute an instance manager 220a or 220b (which may be referred herein singularly as instance manager 220 or in the plural as instance managers 220) capable of executing the virtual machine instances 218. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 1, a router 214 may be utilized to interconnect the servers 216a and 216b. Router 214 may also be connected to gateway 240, which is connected to communications network 230. Router 214 may be connected to one or more load balancers, and alone or in combination may manage communications within networks in data center 210, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 210 shown in FIG. 1, a server manager 215 is also employed to at least in part direct various communications to, from and/or between servers 216a and 216b. While FIG. 1 depicts router 214 positioned between gateway 240 and server manager 215, this is merely an exemplary configuration. In some cases, for example, server manager 215 may be positioned between gateway 240 and router 214. Server manager 215 may, in some cases, examine portions of incoming communications from user computers 202 to determine one or more appropriate servers 216 to receive and/or process the incoming communications. Server manager 215 may determine appropriate servers to receive and/or process the incoming communications based on factors such as an identity, location or other attributes associated with user computers 202, a nature of a task with which the communications are associated, a priority of a task with which the communications are associated, a duration of a task with which the communications are associated, a size and/or estimated resource usage of a task with which the communications are associated and many other factors. Server manager 215 may, for example, collect or otherwise have access to state information and other information associated with various tasks in order to, for example, assist in managing communications and other operations associated with such tasks.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 210 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2:
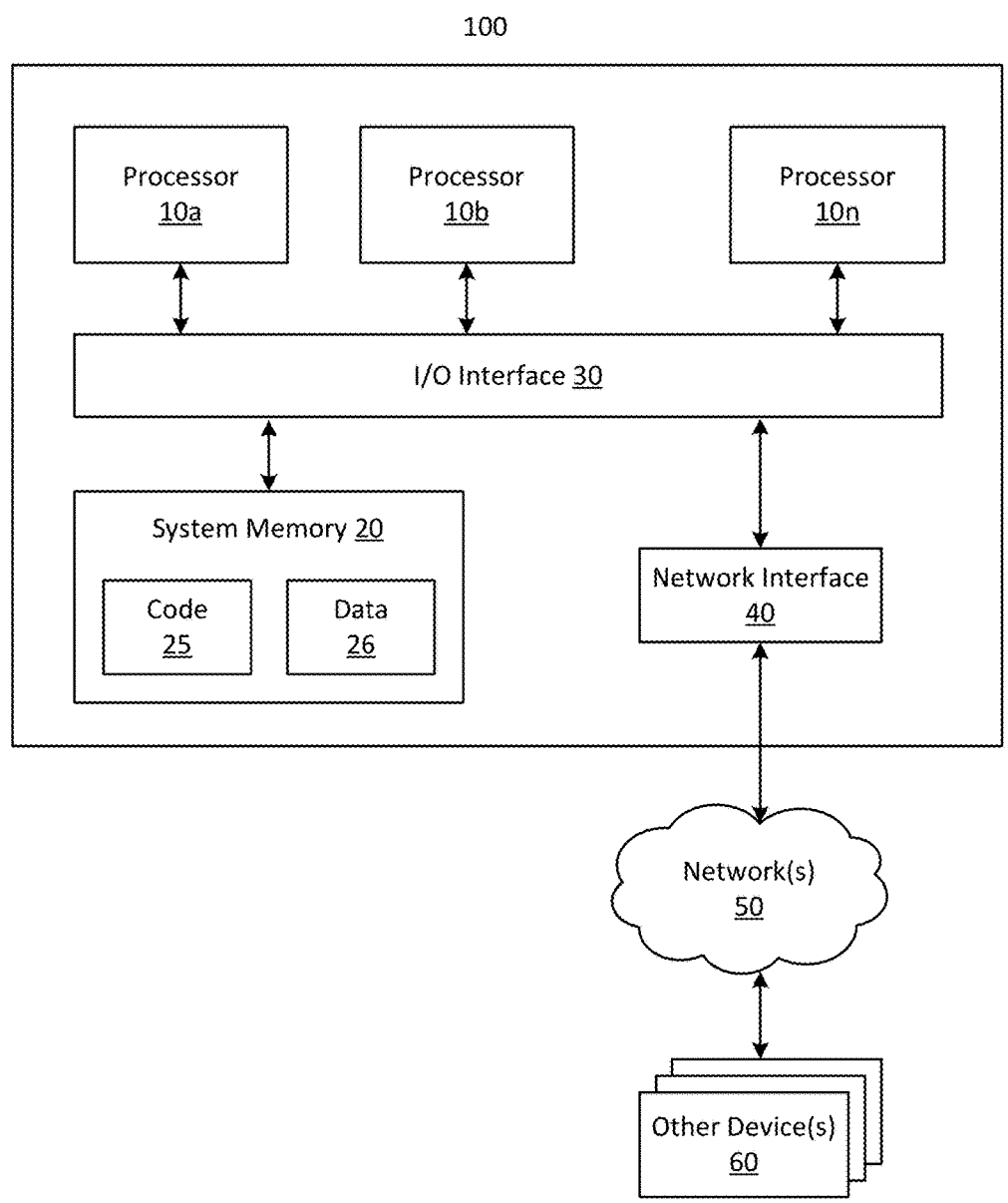
FIG. 2 is a diagram illustrating an example computing system that may be used in accordance with the present disclosure.

In at least some embodiments, a server that implements a portion or all of one or more of the technologies described herein may include a general-purpose computer system that includes or is configured to access one or more computer-accessible media. FIG. 2 depicts a general-purpose computer system that includes or is configured to access one or more computer-accessible media. In the illustrated embodiment, computing device 100 includes one or more processors 10a, 10b and/or 10n (which may be referred herein singularly as "a processor 10" or in the plural as "the processors 10") coupled to a system memory 20 via an input/output (I/O) interface 30. Computing device 100 further includes a network interface 40 coupled to I/O interface 30.

In various embodiments, computing device 100 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be general-purpose or embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 100 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 100 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 100 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40. Portions or all of multiple computing devices, such as those illustrated in FIG. 2, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

Figure 3:
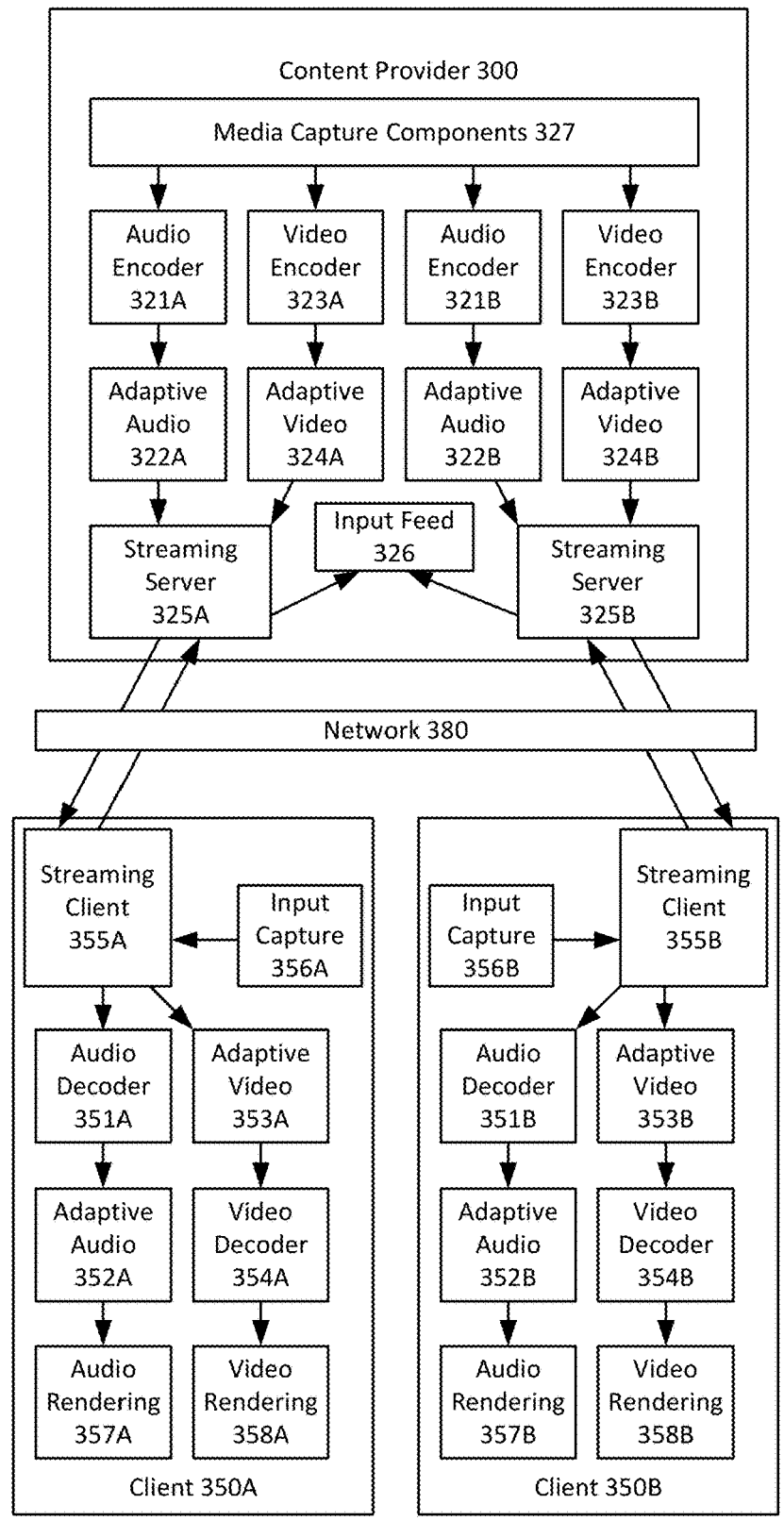
FIG. 3 is a diagram illustrating a first example content transmission system that may be used in accordance with the present disclosure.

FIG. 3 is a diagram illustrating a first example content transmission system that may be used in accordance with the present disclosure. As shown in FIG. 3, content provider 300 includes one or more media capture components 327, which capture video and audio content from one or more underlying components such as graphics processing units (GPUs), audio controllers and others. Content provider 300 and clients 350A-B communicate via network 380, which may, in some cases, be an electronic network such as, for example, the Internet or another type of network. As should be appreciated, although two clients 350A-B are shown in FIG. 3, content provider 300 may provide content to any number of different clients. As should also be appreciated, content provider 300 need not necessarily communicate with clients 350A-B using the same network, and multiple networks may be employed. In the example of FIG. 3, content provider 300 transmits content streams to clients 350A-B. The content streams may include content associated with a content item such as, for example, a video game or a whiteboard application. In some cases, content provider 300 may provide the same or similar content to clients 350A-B. As an example, clients 350A-B may be operated by users that control related characters within a multi-player video game. The characters may, for example, simultaneously interact together in a number of different scenes throughout the course of the video game. As another example, the content provided to clients 350A-B may be associated with a whiteboard application in which both clients 350A-B may update and interact with the application.

However, even in cases when clients 350A-B receive the same or similar content from content provider 300, the actual data that is transmitted to client 350A may be different from the data that is transmitted to client 350B. There are a number of factors that may cause different data to be transmitted to client 350A and client 350B. For example, clients 350A and 350B may include different components with different characteristics and capabilities. In some cases, different clients may include different screen sizes that display data at different resolutions with respect to one another. Also, in some cases, different clients may include different processors with varying speeds and capabilities, different memory components with varying sizes and characteristics, different operating systems and other different hardware and/or software characteristics. As another example, communications from content provider 300 to client 350A may sometimes be subject to different network conditions than communications from content provider 300 to client 350B. These different network conditions may include, for example, different available bandwidths, different loss rates, different latency conditions, different throughput conditions and the like. As will be described in detail below, these and other factors may sometimes cause different data to be transmitted to clients 350A and 350B.

Referring back to FIG. 3, it is seen that content provider 300 includes two audio encoders 321A-B, two adaptive audio components 322A-B, two video encoders 323A-B, two adaptive video components 322A-B and two streaming servers 325A-B, Generally, components 321A-325A are associated with client 350A and are employed as part of the process to provide content to client 350A. By contrast, components 321B-325B are associated with client 350B and are employed as part of the process to provide content to client 350B. The operation of these components will now be described in detail.

As seen in FIG. 3, video data from media capture components 327 is provided to video encoders 323A-B. Generally, video encoders 323A-B may encode and compress video content prior to its transmission to clients 350A-B. Video encoders 323A-B may generally use any appropriate technique to encode and/or compress video content for transmission to clients 350A-B. Video data is then passed to adaptive video components 324A-B, which perform various operations associated with adaptive video communications as will be described in detail below.

Audio data from media capture components 327 is provided to audio encoders 323A-B. Generally, audio encoders 323A-B may encode and compress audio content prior to its transmission to clients 350A-B. Audio encoders 323A-B may generally use any appropriate technique to encode and/or compress audio content for transmission to clients 350A-B. Audio data is then passed to adaptive audio components 324A-B, which perform various operations associated with adaptive audio communications as will be described in detail below.

Streaming servers 325A-B perform various operations for communicating with clients 350A-B, respectively. For example, streaming servers 325A-B may perform various operations for transmission of outgoing data to clients 350A-B over network 380. In particular, streaming servers 325A-B may perform operations such as packetizing outgoing data, applying forward error correction (FEC) and packaging outgoing data in one more communication protocols. The transmitted content may then be received.

At clients 350A-B, incoming data from content provider 300 may be received by streaming clients 355A-B, respectively. Streaming clients 355A-B may perform operations on the incoming data such as processing of incoming packets, extracting of encoded audio and video content and regeneration of frames.

After processing by streaming clients 355A-B, video content may be provided to adaptive video components 353A-B, which may perform various operations associated with adaptive video communications as will be described in detail below. Video content may then be provided to video decoders 354A-B. Generally, video decoders 354A-B may decode and decompress video content prior to its display at clients 350A-B. Video decoders 354A-B may generally use any appropriate technique to decode and/or decompress video content for display at clients 350A-B. After being decompressed and decoded, video content may be passed to video rendering components 358A, which may provide rendered images for display on a display component. The video rendering components 358A may, for example, receive transmitted image information such as frames or portions of frames and process this information into rendered images.

Additionally, after processing by streaming clients 355A-B, audio content may be provided to audio decoders 354A-B. Generally, audio decoders 354A-B may decode and decompress audio content prior to its presentation at clients 350A-B. Audio decoders 354A-B may generally use any appropriate technique to decode and/or decompress audio content for presentation at clients 350A-B. Audio content may then be provided to adaptive audio components 353A-B, which may perform various operations associated with adaptive audio communications as will be described in detail below. After being decompressed and decoded, audio content may be passed to audio rendering components 357A, which may provide rendered audio content for presentation, for example, using audio speakers. The audio rendering components 357A may, for example, receive transmitted audio information and process this information into rendered audio content.

Audio and video content may be presented on clients 350A-B using for, example, video displays, audio speakers and any other appropriate content presentation components. Users may interact with the presented content using input components such as touchscreens, gesture recognition components, controllers, keyboard, mouse, microphone and many others. The user input may be received and captured by one or more input capture components 356A-B. User interaction may, for example, take the form of control of one or more characters in a game, input, manipulation and selection of various types of information and many other forms of input. Upon being captured, all, or any portion, of the input may be transmitted back to content provider 300 by streaming clients 355A-B via network 380.

The received input from clients 350A-B may be compiled by content provider 300 into one or more input feeds 326. The input feeds may, in some cases, be used to generate subsequent portions of a content item for transmission back to clients 350A-B. For example, in the case of video game content, actions performed by one or more characters controlled by clients 350A-B may be used to generate subsequent scenes associated with the video game. As an example, if user input from one of clients 350A-B directs one or more characters to a particular new location, then this input may cause one or more subsequent scenes to be generated that include the one or more characters within the particular new location. In some cases, the input from clients 350A-B may be used by content provider 300 to generate and maintain a single collective content item state that is used to generate subsequent portions of content for transmission to clients 350A-B.

Thus, components such as those shown in FIG. 3 may be employed to transmit content from content provider 300 and present the content at clients 350A-B. As set forth above, adaptive video components 324A-B and 353A-B and adaptive audio components 322A-B and 352A-B may be used to perform various operations associated with adaptive video and adaptive audio, respectively. Some examples of these adaptive video and audio operations will now be described in detail. In general, adaptive video components 324A-B and 353A-B and adaptive audio components 322A-B and 352A-B may be employed, for example, to control the adaptive transmission of video and audio content. In particular, as part of these control operations, adaptive video components 324A-B and 353A-B and adaptive audio components 322A-B and 352A-B may, for example, provide instructions to determine, set and adjust various transmission attributes such as encoding bitrates, proportions of applied forward error correction (FEC), frame rate, resolution, an amount of change between subsequent frames and prior reference frames and various other transmission attributes. The technique of FEC may involve coding of transmitted data using an error correcting code to include both source bits and additional redundant bits that may be used, for example, to detect and correct errors occurring during the transmission process. An applied proportion of forward error correction corresponds to a ratio of a number of redundant bits in comparison to a number of source bits.

As an example, adaptive video components 324A-B may communicate with video encoders 323A-B, respectively, regarding instructions for setting an encoding bitrate for video content transmitted to clients 350A-B, respectively. As another example, adaptive audio components 322A-B may communicate with video encoders 321A-B, respectively, regarding instructions for setting an encoding bitrate for audio content transmitted to clients 350A-B, respectively. As yet another example, adaptive video components 324A-B and/or adaptive audio components 322A-B may communicate with streaming servers 325A-B, respectively, regarding instructions for a proportion of FEC to be applied to content transmitted to clients 350A-B, respectively.

Adaptive video components 324A-B and 353A-B and adaptive audio components 322A-B and 352A-B may also, for example, collect, communicate and maintain information associated with the determination of transmission attributes. For example, in some cases, transmission attributes may be determined based on various transmission conditions such as network conditions, device characteristics and others.

In particular, network conditions may include any conditions that affect the transmission of data over a network such as, for example, available bandwidth, loss rates, latency, throughput and others. In some cases, adaptive video components 324A-B and 353A-B and adaptive audio components 322A-B and 352A-B may function in combination to perform various operations for estimating network conditions at one or more instances before and/or during content transmission. For example, in some cases, components at content provider 300 and client 350A may function in combination to estimate one or more network conditions for communications between content provider 300 and client 350A, while components at content provider 300 and client 350B may function in combination to estimate one or more network conditions for communications between content provider 300 and client 350B.

As an example, available bandwidth may be estimated, in some cases, by determining a size of a particular portion of data transmitted from content provider 300 to one of clients 350A-B. The size may then be divided by an amount of time required to transmit the data. As another example, loss rates may be estimated, in some cases, by determining a size of a particular portion of data transmitted from content provider 300 to one of clients 350A-B. The size may then be compared to the amount of data that is actually received. Adaptive transmission components at the content provider 300 and each of clients 350A-B may combine to obtain and exchange information and perform calculations in any appropriate manner.

Transmission condition information may also include other information such as distortion due to compression and/or packet loss and confirmations of whether packets, frames and/or portions of frames have been received by a particular client. Transmission condition information may be obtained and updated at any appropriate interval before and/or during content transmission. For example, in some cases, transmission condition information may be obtained at a frame-by-frame interval or in intervals of a plurality of frames. As should be appreciated, different information may be obtained at different intervals with respect to one another. Additionally, transmission attributes may be set and adjusted at any appropriate interval during content transmission. For example, in some cases, transmission attributes may be set and adjusted at a frame-by-frame interval or in intervals of a plurality of frames. As should be appreciated, different transmission attributes may be set and adjusted at different intervals with respect to one another.

Adaptive video components 324A-B and 353A-B and adaptive audio components 322A-B and 352A-B may use transmission condition information such as network conditions to determine and adjust transmission attributes such as encoding bitrate, applied proportion of FEC and others. In one simplified example, when network conditions are determined to be poor, the encoding bitrate for transmitted content may, in some cases, be reduced. By contrast, when network conditions are favorable, the encoding bitrate for transmitted content may, in some cases, be increased. Poor network conditions may include conditions such as low bandwidth, high loss rates and high latency, while favorable network conditions may include conditions such as high bandwidth, low loss rates and low latency. In another simplified example, when loss rates are determined to be high, the proportion of FEC applied to transmitted content may, in some cases, be increased. By contrast, when loss rates are determined to be low, the proportion of FEC applied to transmitted content may, in some cases, be reduced. It is noted that the above examples are merely intended to describe some possible strategies for setting of transmission attributes and that many other similar or non-similar strategies may be employed.

Additionally, in some cases, determinations and/or adjustments of all or some of the transmission attributes may be at least partially dependent upon one another. For example, in some cases, when it is determined that the encoding bitrate will be dynamically increased, then the applied proportion of FEC may be dynamically decreased in order to make more bits available for application of the higher encoding bitrate. By contrast, in some cases, when it is determined that the encoding bitrate will be dynamically decreased, then the applied proportion of FEC may be dynamically increased due to more bits being available for application of forward error correction. As another example, in some cases, when it is determined that the applied proportion of FEC will be dynamically increased, then the encoding bitrate may be dynamically decreased in order to make more bits available for the increase in FEC. By contrast, in some cases, when it is determined that the applied proportion of FEC will be dynamically decreased, then the encoding bitrate may be dynamically increased due to more bits being available as a result of the decrease in FEC.

In addition to information about network conditions, adaptive video components 324A-B and 353A-B and adaptive audio components 322A-B and 352A-B may also collect, communicate and maintain information associated with device characteristics corresponding to clients 350A-B. This device characteristic information may include any information corresponding to any characteristics of clients 350A-B that may relate to the transmission and/or presentation of content to and at clients 350A-B. For example, these characteristics may include information regarding screen sizes, display resolutions, processor characteristics (e.g., processor speed), memory characteristics (e.g., memory size), operating system characteristics and others.

Device characteristic information may also be used to set and adjust transmission attributes such as encoding bitrate, applied proportion of FEC and others. For example, higher resolution displays may sometimes require a greater quantity of video content to be transmitted relative to lower resolution displays. This may sometimes cause content for higher resolution displays to be transmitted with a lower encoding bitrate and/or a lower applied proportion of FEC in comparison to similar content that is transmitted for lower resolution displays. As another example, clients with faster processing speeds may sometimes be more capable of streaming data that is transmitted with higher encoding bitrates and/or higher applied proportions of FEC as compared to clients with slower processing speeds. Thus, processing speed and other device characteristics may also affect the setting and adjusting of transmission attributes. It is noted that the above examples are merely intended to describe some possible strategies for setting of transmission attributes based on device characteristics and that many other similar or non-similar strategies may be employed.

Thus, attributes such as encoding bitrate, applied proportion of FEC and others may be set and adjusted based on various transmission conditions such as network conditions, device characteristics and others. As set forth above, transmission conditions such as network conditions and device characteristics may sometimes be different for each client 350A and 350B to which content is transmitted. Thus, even in cases when clients 350A and 350B are receiving the same or similar content, the actual bits that are transmitted to each client 350A and 350B may sometimes be quite different.

As set forth above, FIG. 3 depicts an example scenario in which both clients 350A and 350B provide input for controlling and/or interacting with transmitted content. As shown in FIG. 3, this input as captured via input capture components 356A-B at clients 350A-B, respectively. In some other scenarios, however, some client devices may receive transmitted content without providing input for controlling and/or interacting with transmitted content. This may occur, for example, when one or more clients present a video game in a spectator mode. The spectator mode may allow the video game may be viewed without, for example, the ability to control characters or other entities within the video game. In contrast with the spectator mode, clients that actively control characters or other entities within the video game are referred to as participant mode clients. Another example in which some client devices may not control the presentation of content is a training application, in which one client may actively control the application and share with one or more other training clients that do not actively control the execution of the content.

Figure 4:
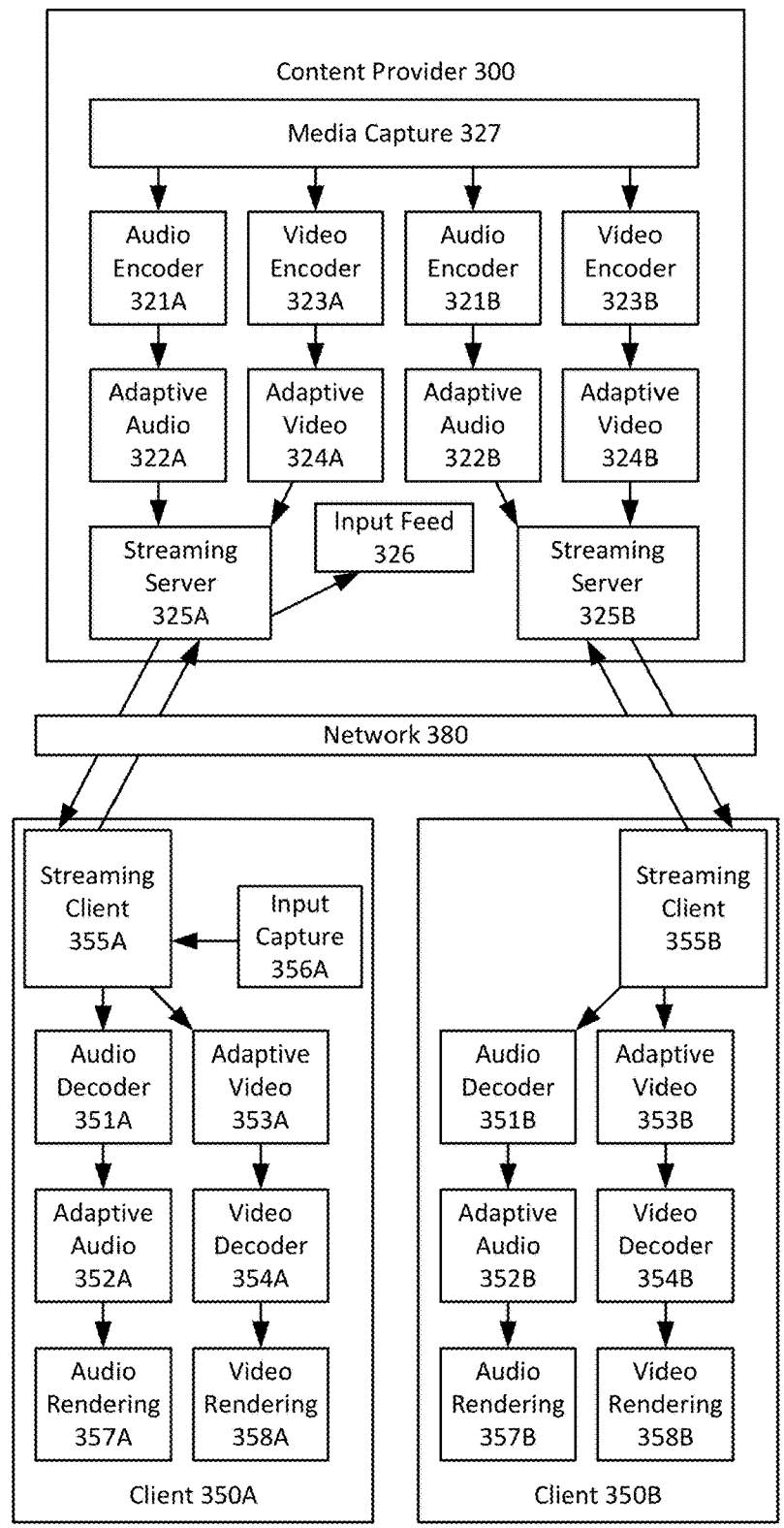
FIG. 4 is a diagram illustrating a second example content transmission system that may be used in accordance with the present disclosure.

An example content transmission system in which at least one client does not control the execution of transmitted content is depicted in FIG. 4. As shown, FIG. 4 is similar to the prior example depicted in FIG. 3 with a number of exceptions. One difference between FIG. 3 and FIG. 4 is that, in FIG. 4, while client 350A is depicted with an input capture component 356A, client 350B is not depicted with a respective input capture component. This is not necessarily intended to indicate that client 350B lacks the ability to capture user input. Rather, this is merely intended to indicate that, in the particular example of FIG. 4, client 350B is not providing captured input back to content provider 300 in association with controlling the execution of content from content provider 300. Another difference between FIG. 3 and FIG. 4 is that, in FIG. 4, there is no arrow pointing from streaming server 325B to input feed 326. Once again, this indicates that user input from client 350B is not being used to control the execution of content. Thus, for example, while client 350A may be presenting content in a participant mode, client 350B may be presenting the same content, for example, in a spectator mode or training mode. As should be appreciated, while two clients 350A-B are shown in FIG. 4, content provider 300 may transmit content to any number of additional clients that may or may not control the presentation of content transmitted from content provider 300.

It is noted that, in the example of FIG. 4, while user input from client 350B may not be used to control the presentation of audio and video content, this does not mean that no information is being provided by client 350B to content provider 300. Rather, client 350B may still be providing transmission condition information for setting and adjusting transmission attributes for the content transmitted to client 350B. For example, client 350B may provide device characteristic information about itself such as screen size, resolution, processor and memory characteristics and others. Client 350B may also provide transmission condition information, such as indications of available bandwidth, loss rates or any other information that could be used by content provider 300 to estimate such network conditions. It is noted that, in FIG. 4, client 350B continues to have associated adaptive video components 324B and 353B and adaptive audio components 322B and 351B just as depicted in FIG. 3.

Thus, as set forth above, FIGS. 3 and 4 depict some example scenarios in which multiple content streams may be transmitted to multiple respective clients. However, in some cases, rather than transmitting a separate content stream to each client that presents content, a content provider may send a single content stream that is provided to one client, which, in turn, forwards the content stream along to one or more other clients. The client that receives and then forwards the content stream is referred to herein as a relay client, while the one or more other clients that receive content without forwarding the content are referred to herein as endpoint clients. As should be appreciated, in some cases, in addition to forwarding a content stream to endpoint clients, a relay client may also forward the content stream to one or more other relay clients until the content is eventually forwarded to one or more endpoint clients.

Figure 5:
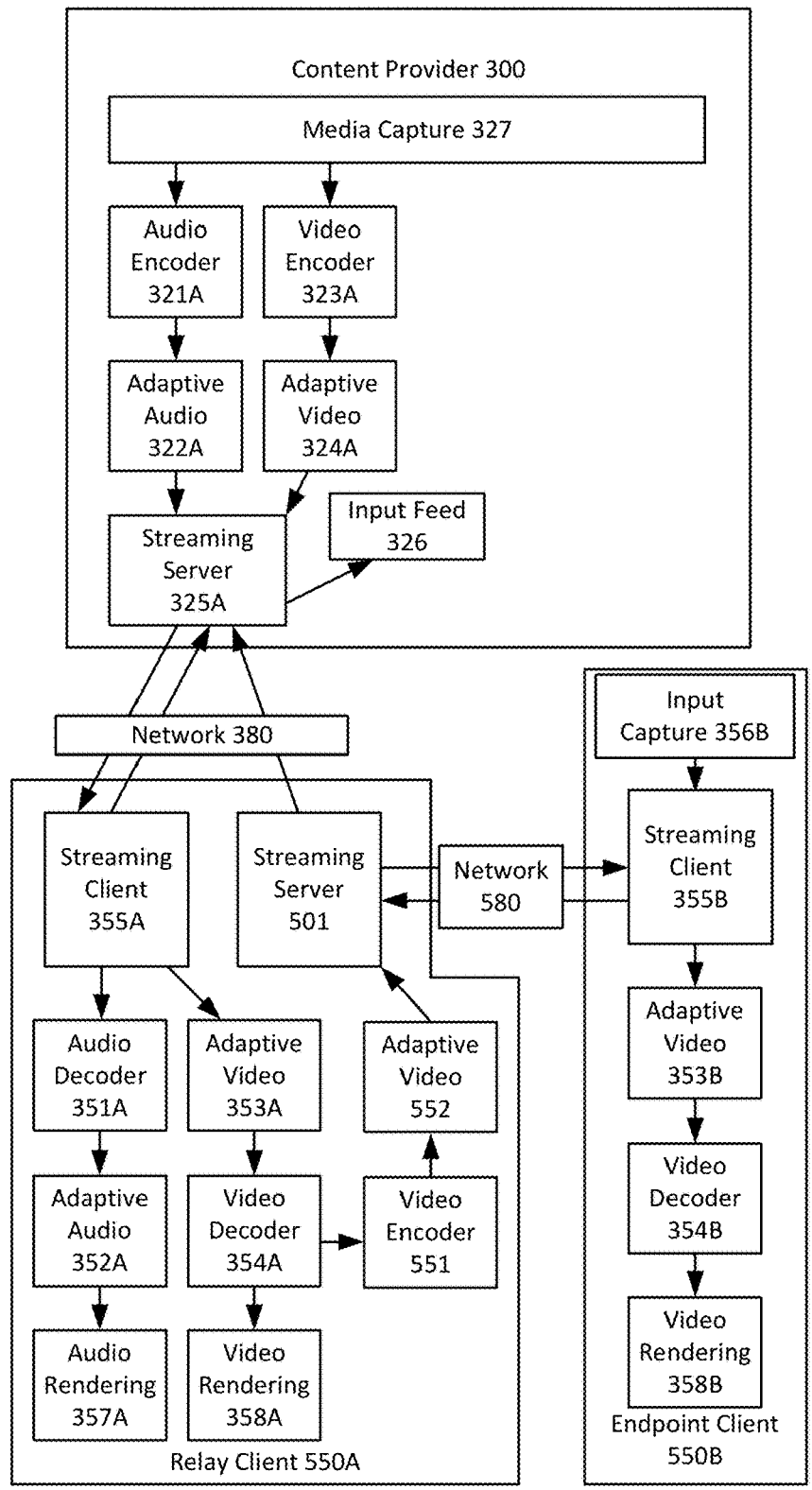
FIG. 5 is a diagram illustrating a third example content transmission system that may be used in accordance with the present disclosure.

FIG. 5 depicts an example system in which a content stream is provided from content provider 300 to a relay client 550A, which, in turn, forwards the content stream along to endpoint client 550B. There are a number of scenarios in which a system including relay client 500A and endpoint client 550B may be advantageous. As an example, a system such as depicted in FIG. 5 may be employed in a scenario in which endpoint client 550B serves as an input device for controlling the presentation of content displayed on both clients 550A and 550B. In some cases, relay client 550A may be a higher performance device in comparison to endpoint client 550B. Also, in some cases, endpoint client 550B may be, for example, a mobile device while relay client 550A may be a device that includes or connects to a large screen display such as a television. Also, in some cases, endpoint client 550B may provide a soft controller interface for controlling content that is displayed on clients 550A and 550B. Such a soft controller interface may include, for example, buttons or other controls that are displayed or otherwise associated with areas on a touchscreen. In these and other cases, it may be desirable for relay client 550A and endpoint client 550B to display at least a portion of the same or similar content simultaneously or near simultaneously with respect to one another.

As shown in FIG. 5, content is provided from content provider 300 to relay client 550A using a similar arrangement as used to provide content from content provider 300 to client 350A in prior FIGS. 3 and 4. In particular, content provider 300 includes a streaming server 325A, which transmits content over network 380 to streaming client 355A at relay client 550A. Content provider 300 of FIG. 5 once again includes adaptive video component 324A and adaptive audio component 322A, which may cooperate with adaptive video component 353A and adaptive audio component 352A at relay client 550A to set and adjust various transmission attributes associated with the transmission of content from content provider 300 to relay client 550A. In some cases, transmission attributes may be set and adjusted for transmission of content from content provider 300 to relay client 550A based, at least in part, on transmission conditions associated with transmission of content from content provider 300 to relay client 550A. As will be described below, in some cases, transmission conditions associated with transmission of content from relay client 550A to endpoint client 550B may also be considered when setting or adjusting transmission attributes for transmission of content from content provider 300 to relay client 550A. Some example techniques for setting and adjusting transmission attributes based on transmission conditions are set forth in detail above and are not repeated here. The transmitted content from content provider 300 may be received at relay client 550A, which may employ audio decoder 351A and video decoder 354A to decode and decompress the content. The decoded and decompressed content may then be passed to audio rendering components 357A and video rendering components 358A, which may provide rendered audio and video content for presentation at relay client 550A using presentation components such as a video display, audio speakers and others.

However, in addition to presenting received content, relay client 550A may also forward the received content to endpoint client 550B over network 580. In some cases, network 580 may be, for example, a LAN such as a home network or other smaller scale network. However, there is no requirement that network 580 must be a LAN, and network 580 may also be a WAN such as the Internet or another type of network. In order to forward the content stream along to endpoint client 550B, relay client 550A includes an additional streaming server 501 that communicates with streaming client 355B at endpoint client 550B.

In some cases, transmission conditions associated with transmission of content from content provider 300 to relay client 550A may be different than transmission conditions associated with transmission of content from relay client 550A to endpoint client 550B. For example, in some cases, network conditions such as bandwidth, loss rates, latency and others may be different for transmissions from content provider 300 to relay client 550A relative to transmissions from relay client 550A to endpoint client 550B. As another example, in some cases, relay client 550A and endpoint client 550B may have different device characteristics, such as screen size, resolution, operating systems, processor and memory characteristics and others. Thus, in some cases, transmission attributes that are desirable for transmission of content from content provider 300 to relay client 550A may not be desirable for transmission of content from relay client 550A to endpoint client 550B.

For these and other reasons, relay client 550A may, in some cases, change one or more transmission attributes of the content received from content provider 300 prior to forwarding the content to endpoint client 550B. In particular, in some cases, after being decoded and decompressed by video decoder 354A, the video content may, in addition to being displayed by relay client 550A, also be re-encoded and recompressed by video encoder 551 for transmission from relay client 550A to endpoint client 550B. It is noted that the encoding bitrate applied for transmission of content from relay client 550A to endpoint client 550B may sometimes be different than the encoding bitrate applied for transmission of content from content provider 300 to relay client 550A.

Additionally, streaming server 501 at relay client 550A may perform various operations for forwarding received content to endpoint client 550. In particular, streaming server 501 may perform operations such as packetizing outgoing data, applying FEC and packaging outgoing data in one more communication protocols. It is noted that the applied proportion of FEC and other attributes for transmission of content from relay client 550A to endpoint client 550B may be different than the applied proportion of FEC and other attributes for transmission of content from content provider 300 to relay client 550A.

At endpoint client 550B, incoming data from relay client 550A may be received by streaming client 355B, which may perform operations on the incoming data such as processing of incoming packets, extracting of encoded video content and regeneration of frames. After processing by streaming client 355B, video content may be provided to video decoder 354B, which may decode and decompress video content prior to its display at endpoint client 550B. The video content may be passed to video rendering components 358B, which may provide rendered video content for display at endpoint client 550B using display components such as a touchscreen or other types of displays.

Adaptive video components 552 and 353B at relay client 550A and endpoint client 550B may perform operations associated with adaptive video transmission from relay client 550A to endpoint client 550B. For example, adaptive video component 552 may communicate with video encoder 551 regarding instructions for setting an encoding bitrate for video content transmitted to endpoint client 550B. As another example, adaptive audio component 552 may communicate with streaming server 501 regarding instructions for a proportion of FEC to be applied to video content transmitted to endpoint client 550B. Adaptive video components 552 and 353B may also, for example, collect, update and maintain transmission condition information for communication between relay client 550A and endpoint client 550B. For example, adaptive video components 552 and 353B may perform various operations for estimating network conditions, such as available bandwidth, loss rates and latency for communications between relay client 550A and endpoint client 550B. As another example, adaptive video components 552 and 353B may collect and maintain device characteristic information associated with endpoint client 550A, such as screen size, display resolutions, processor and memory characteristics, operating system characteristics and others. This information may be used by adaptive video components 552 and 353B as described in detail above to set and adjust transmission attributes, such as encoding bitrate, applied proportion of FEC and others for content transmitted from relay client 550A to endpoint client 550B.

It is noted that FIG. 5 depicts example relay client 550A as decoding and presenting both video and audio content, while example endpoint client 550B decodes and presents video content without corresponding audio content. This particular example configuration may sometimes be advantageous in scenarios when, for example, relay client 550A and endpoint client 550B are in close proximity to one another such that audio from relay client 550B may be sufficiently heard by a user of endpoint client 550B. As should be appreciated, however, the configuration depicted in FIG. 5 is merely one example of how content may be presented by relay client 550A and endpoint 550B. For example, it is noted that there is no requirement that relay client 550A must present audio content and/or video content. As another example, in some cases, endpoint client 550B may receive, decode and present both video and audio content or may only present audio content without presenting corresponding video content. In such cases, relay client 550A may sometimes employ an audio encoder and additional adaptive audio components, while endpoint client 550B may sometimes employ an audio decoder, adaptive audio components and audio rendering components. These adaptive audio components at relay client 550A and endpoint client 550B may, for example, function to set and adjust transmission attributes for transmission of audio content from relay client 550A to endpoint client 550B in a similar fashion to that described above for video content.

Upon presenting content, endpoint client 550B, may receive user input for controlling and interacting with the content. The user input may be provided by one or more input components such as a soft controller interface displayed using a touchscreen and/or various other components. The user input may be received and captured by one or more input capture components 356B. Upon being captured, all, or any portion, of the input may be transmitted back to streaming server 501 at relay client 550A by streaming client 355B over network 580. Streaming server 501 may, in turn, forward the received input back to streaming server 325A at content provider 300 over network 380. The received input may then be compiled by content provider 300 into one or more input feeds 326. The input feeds 326 may, in some cases, be used to generate subsequent portions of a content item for transmission back to clients 550A-B as set forth in detail above. As should be appreciated, although only clients 550A-B are shown in FIG. 5, content provider 300 may transmit content to any number of other additional clients, which may also optionally provide input back to content provider 300.

It is noted that FIG. 5 depicts example endpoint client 550B as capturing user input in association with the transmitted content via input capture components 356B, while example relay client 550A is not depicted as capturing user input in association with the transmitted content. As should be appreciated, however, the configuration depicted in FIG. 5 is merely one example of how input may be collected by relay client 550A and endpoint 550B. For example, in some cases, both endpoint client 550B and relay client 550A may capture user input in association with the transmitted content. As another example, in some cases, relay client 550A may capture user input in association with the transmitted content, while endpoint client 550B may not capture user input in association with the transmitted content.

Prior to forwarding input from endpoint client 550B back to content provider 300, relay client 550A may perform various pre-processing operations on the received input. For example, relay client 550A may convert or translate the received into one or more protocols or formats that can be easily understood or processed by content provider 300. Relay client 550A may also compile or otherwise organize or manipulate the received input. For example, a series of movements by a particular character over a certain time span may be condensed into a single movement from a start point to an end point. As another example, for cases in which input is captured by both relay client 550A and endpoint client 550B, the inputs from both clients may sometimes by condensed or otherwise merged or combined prior to being sent to content provider 300.

As set forth above, in some cases, content may be transmitted from the content provider 300 to the relay client 550A based, at least in part, on transmission conditions associated with transmission of content from content provider 300 to relay client 550A. However, as also noted above, in some cases, transmission conditions associated with transmission of content from relay client 550A to endpoint client 550B may also be considered when setting or adjusting transmission attributes for transmission of content from content provider 300 to relay client 550A. Thus, in some cases, content may be transmitted from the content provider 300 to the relay client 550A based, at least in part, on both transmission conditions associated with transmission of content from content provider 300 to relay client 550A and also transmission conditions associated with transmission of content from relay client 550A to endpoint client 550B. In these and other cases, the content provider 300, the relay client 550A and the endpoint client 550B may cooperate with one another to collect and exchange information associated with determination of transmission conditions as appropriate. As an example, in some cases, if endpoint client 550B fails to receive a transmission of a particular frame or portion of a frame, then information indicating this failure may be provided to the content provider 300, which may, in some cases, use the information to set or adjust transmission attributes for transmission of a subsequent frame or portions of a subsequent frame from the content provider 300 to the relay client 550A and for forwarding to the endpoint client 550B.

It is noted, however, that even when transmission conditions associated with transmission of content from relay client 550A to endpoint client 550B are considered when setting or adjusting one or more transmission attributes for transmission of content from the content provider 300 to the relay client 550A, the relay client 550A may, in many cases, still change one or more transmission attributes for the content before transmitting the content from the relay client 550A to the endpoint client 550B.

As set forth above, in some cases, it may be advantageous for relay client 550A and endpoint client 550B to present all, or one or more portions of, transmitted content simultaneously or near simultaneously with respect to one another. For example, in cases where endpoint client 550B is being used as a soft controller for a video game that is displayed on both endpoint client 550B and relay client 550A, it may be advantageous for relay client 550A and endpoint client 550B to present all, or one or more portions of, the video game simultaneously or near simultaneously with respect to one another. This may, in some cases, enable a user to switch his or her viewing of the content between relay client 550A and endpoint client 550B without experiencing a time lapse of other inconsistency in the presentation of the content.

Various techniques may be employed to enable content to be simultaneously or near simultaneously displayed on relay client 550A and endpoint client 550B. For example, in some cases, relay client 550A may estimate an amount of time that it will take a particular frame or other portion of content to be transmitted from relay client 550A to endpoint client 550B and presented at endpoint client 550B. Relay client 550A may then delay presentation of the frame or other portion of content at relay client 550A until reaching the estimated time for presentation of the corresponding frame or other portion of content at endpoint client 550B.

In some cases, relay client 550A may estimate the time at which content will be presented by endpoint client 550B based on the same or similar information that is also used to determine transmission attributes for transmitting content to endpoint client 550B. For example, relay client 550A may perform presentation time estimates based on transmission condition information such as network conditions and device characteristics associated with endpoint client 550B and network 580. In particular, in some cases, presentation time estimates may be based, at least in part, on network conditions, such as available bandwidth, loss rates, latency and other characteristics associated with transmission of data from relay client 550A to endpoint client 550B. Also, in some cases, presentation time estimates may be based, at least in part, on device characteristic information associated with endpoint client 550B such as screen size, display resolutions, processor and memory characteristics, operating system characteristics and others.

Thus, FIG. 5 depicts an example scenario in which content transmitted from content provider 300 is received and presented at relay client 550A, which also forwards the received content to endpoint client 550B. The example configuration depicted in FIG. 5 allows multiple client devices to receive content from content provider 300 without requiring the content provider 300 to separately transmit multiple streams to each of the multiple client devices. In some cases, this may, for example, improve the available bandwidth for other communications to or from these devices.

Figure 6:
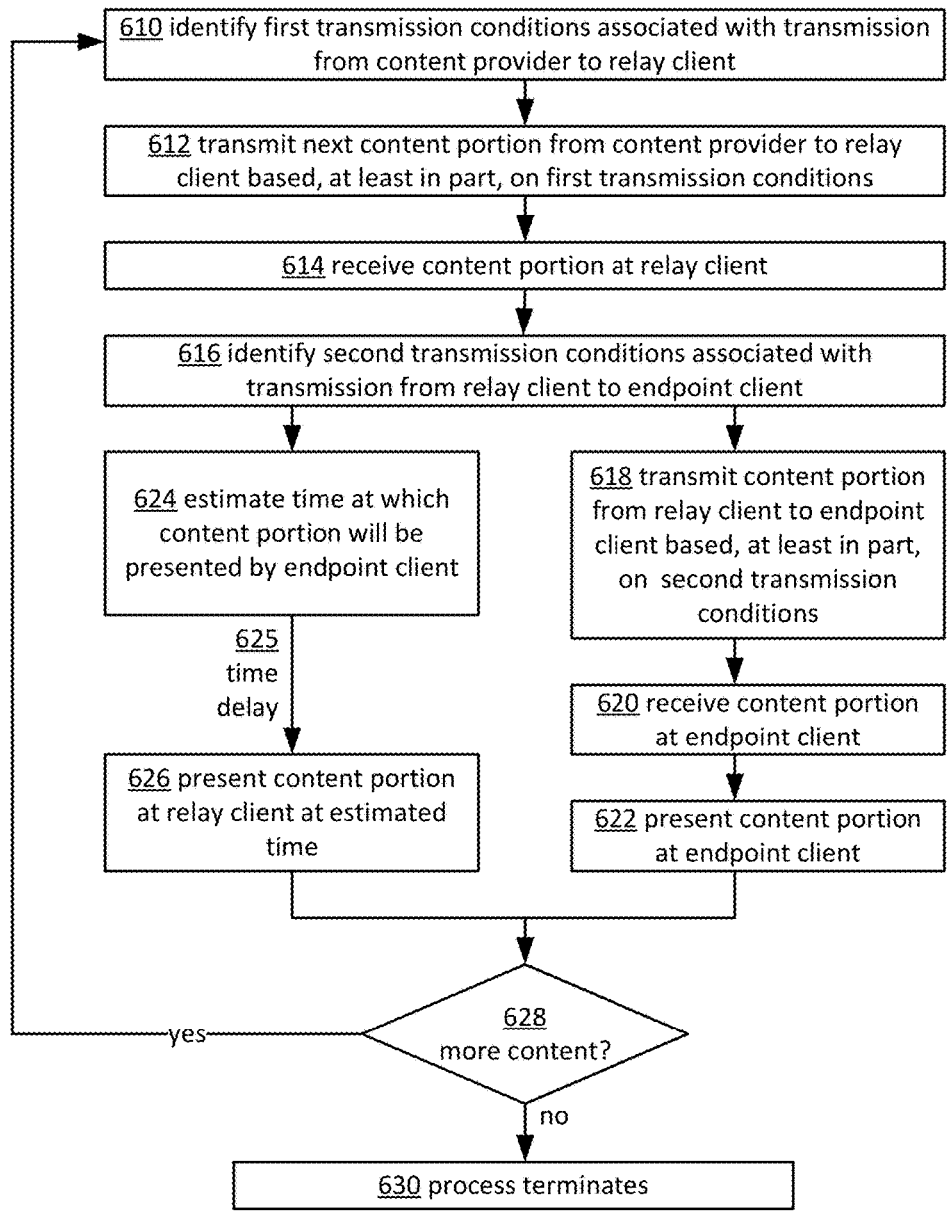
FIG. 6 is a flowchart depicting an example process for transmission of content to a relay client and an endpoint client.

FIG. 6 is a flowchart depicting an example process for transmission of content to a relay client and an endpoint client. At operation 610, a content provider identifies transmission conditions associated with transmission from the content provider to a relay client. For purposes of convenience, the transmission conditions associated with transmission from the content provider to a relay client are referred to herein as first transmission conditions. The first transmission conditions may be identified, for example, based on information and/or calculations provided by the content provider, the relay client and/or other nodes or devices. As set forth above, the first transmission conditions may include any information associated with transmission of content from the content provider to the relay client including, for example, network conditions and device characteristics. Network conditions may include, for example, available bandwidth, loss rates, latency, throughput and other characteristics associated with transmission from the content provider to the relay client. Device characteristics may include, for example, screen size, resolution, operating system characteristics, processor and memory characteristics and other characteristics associated with the relay client.

At operation 612, a next portion of content is transmitted from the content provider to the relay client based, at least in part, on the first transmission conditions. The next portion of content may include, for example, one or more frames or any other appropriate portion of content. As set forth above, content may be transmitted based, at least in part, on transmission conditions by, for example, setting or adjusting one or more transmission attributes based, at least in part, on the transmission conditions. Transmission attributes may include, for example, encoding bitrates, applied proportions of FEC, frame rate, resolution and others. A number of example techniques for setting and adjusting of transmission attributes based, at least in part, on transmission conditions are set forth in detail above and are not repeated here.

At operation 614, the transmitted content portion is received by the relay client. At operation 616, the relay client identifies transmission conditions associated with transmission from the relay client to the endpoint client. For purposes of convenience, the transmission conditions associated with transmission from the relay client to the endpoint client are referred to herein as second transmission conditions. The second transmission conditions may be identified, for example, based on information and/or calculations provided by the relay client, the endpoint client and/or other nodes or devices. As set forth above, the second transmission conditions may include any information associated with transmission of content from the relay client to the endpoint client including, for example, network conditions and device characteristics. Network conditions may include, for example, available bandwidth, loss rates, latency, throughput and other characteristics associated with transmission from the relay client to the endpoint client. Device characteristics may include, for example, screen size, resolution, operating system characteristics, processor and memory characteristics and other characteristics associated with the endpoint client.

At operation 618, the next portion of content is transmitted from relay client to the endpoint client based, at least in part, on the second transmission conditions. As set forth above, content may be transmitted based, at least in part, on transmission conditions by, for example, setting or adjusting one or more transmission attributes based, at least in part, on the transmission conditions. At operation 620, the transmitted content portion is received by the endpoint client. At operation 622, the transmitted content portion is presented by the endpoint client.

In some cases, operations 624 and 626 may be performed at least partially simultaneously with operations 618, 620 and 622. In particular, at operation 624, the relay client estimates a time at which the content portion will be presented by the endpoint client. As set forth above, the estimation at operation 624 may sometimes be performed based on the second transmission conditions identified at operation 616. At operation 626, the content portion is presented by the relay client at the time estimated at operation 624. The elongated arrow from operation 622 to 624 is intended to represent that there may be a time delay 625 between the time that the content portion is ready for presentation by the relay client and the estimated time at which the content is ready for presentation by the endpoint client. As set forth above, the relay client may delay the presentation of the content portion until the time estimated at operation 624 in order to cause the content portion to be presented simultaneously or near simultaneously by both the relay client and the endpoint client.

At operation 628, it is determined whether there is any more content to be transmitted from the content provider. If there is no more content, then the process terminates at operation 630. On the other hand, if there is more content, then the process return to operation 610 and repeats itself for a next portion of content. It is noted that, although not depicted in FIG. 6, user input may, in some cases, be captured by the endpoint client and/or the relay client and returned back to the content provider. As set forth above, user input from the endpoint client may be first transmitted from the endpoint client to the relay client and then forwarded from the relay client to the content provider. Additionally, the relay client may, in some cases, pre-process input from the endpoint client before forwarding the input back to the content provider. Some examples of these pre-processing operations are also described in detail above.

Thus, FIG. 6 depicts an example process for transmission of content to a relay client and an endpoint client. It is noted that, in some cases, in addition to first transmission conditions associated with transmission from the content provider to the relay client, second transmission conditions associated with transmission from the relay client to the endpoint client may also be considered when setting or adjusting transmission attributes for transmitting content from the content provider to the relay client. Thus, in some cases, at operation 610, in addition to first transmission conditions associated with transmission from the content provider to the relay client, the content provider may also identify second transmission conditions associated with transmission from the relay client to the endpoint client. Additionally, in some cases, at operation 612, the next portion of content may be transmitted from the content provider to the relay client based, at least in part, on both the first transmission conditions associated with transmission from the content provider to the relay client and the second transmission conditions associated with transmission from the relay client to the endpoint client.

It is also noted that, while the above examples of FIGS. 5 and 6 include a relay client, there is no requirement that the relay device must be a client. There is also no requirement that the relay client must necessarily present the content itself. For example, in some configurations, a content provider may transmit content to a relay server or cluster of relay servers, which, in turn, forward the transmitted content to one or more other relay devices and/or one or more endpoint devices. These relay servers may identify transmission conditions for transmission from the relay servers to the other relay devices and/or one or more endpoint devices using all, or any portion, of the techniques described above. Additionally, user input from the endpoint devices may be received and relayed by the relay servers back to the content provider. The relay server may perform any or all of the pre-processing techniques for user input set forth in detail above.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for transmitting and presenting video content comprising:
    at least one server computing device that identifies one or more first transmission conditions associated with a transmission of the video content from the at least one server computing device to a first client compute node and encodes and transmits the video content to the first client compute node based, at least in part, on the one or more first transmission conditions;
    the first client compute node that decodes, receives and presents the video content, identifies one or more second transmission conditions associated with a transmission of the video content from the first client compute node to a second client compute node and transmits the video content to the second client compute node based, at least in part, on the one or more second transmission conditions, the first client compute node estimating, based at least in part on the one or more second transmission conditions, a time that it will take to transmit the video content to the second client compute node, the first client compute node delaying its presentation of the video content based at least in part on the estimated time, wherein the first client compute node re-encodes the video content to transmit to the second client compute node, wherein the video content is re-encoded using a different encoding bitrate than was used to transmit the video content to the first client compute node, wherein the different encoding bitrate used for re-encoding is set based on the one or more second transmission conditions, and wherein a different proportion of forward error correction is applied to transmit the video content to the second client compute node than is used to transmit the video content to the first client compute node, the different proportion of forward error correction determined based at least in part on one or more loss rates associated with transmitting to the second client compute node, the one or more loss rates included in the one or more second transmission conditions; and
    the second client compute node that receives and presents the video content, receives user input associated with the video content and transmits the user input to the first client compute node,
    wherein the first client compute node receives the user input and transmits the user input to the at least one server computing device.

2. The system of claim 1, wherein the second client compute node provides a soft controller interface that receives the user input.

3. The system of claim 1, wherein the one or more first transmission conditions comprise at least one of available bandwidth, loss rates or latency associated with transmitting from the at least one server computing device to the first client compute node, and wherein the one or more second transmission conditions comprise at least one of available bandwidth or latency associated with transmitting from the first client compute node to the second client compute node.

4. The system of claim 1, wherein the video content is transmitted based, at least in part, on the one or more first transmission conditions by setting at least one of an encoding bitrate and an applied proportion of forward error correction for the transmission of the video content to the first client compute node based, at least in part, on the first transmission conditions.

5. A computer-implemented method for transmitting and presenting video content comprising:
receiving the video content transmitted based, at least in part, on one or more first transmission conditions associated with a transmission of the video content from a server compute node to a first client compute node, wherein the server compute node encodes the video content;
decoding the video content;
identifying one or more second transmission conditions associated with a transmission of the video content from the first client compute node to a second client compute node;
re-encoding the video content for transmission to the second client compute node, wherein the video content is re-encoded using a different encoding bitrate than was used for the transmission of the video content from the server compute node to the first client compute node, wherein the different encoding bitrate used for re-encoding is set based on the one or more second transmission conditions, and wherein a different proportion of forward error correction is applied to transmit the video content to the second client compute node than is used to transmit the video content to the first client compute node, the different proportion of forward error correction determined based at least in part on one or more loss rates associated with transmitting to the second client compute node, the one or more loss rates included in the one or more second transmission conditions;
transmitting the video content to the second client compute node based, at least in part, on the one or more second transmission conditions;
estimating, based at least in part on the one or more second transmission conditions, a time that it will take to transmit the video content to the second client compute node; and
presenting, by the first client compute node, the video content based at least in part on the estimated time.

6. The computer-implemented method of claim 5, wherein the one or more first transmission conditions comprise at least one of screen size, resolution, processor characteristics or memory characteristics of the first client compute node, and wherein the one or more second transmission conditions comprise at least one of screen size, resolution, processor characteristics or memory characteristics of the second client compute node.

7. The computer-implemented method of claim 5, wherein the one or more first transmission conditions comprise at least one of available bandwidth, loss rates or latency associated with transmitting from the server compute node to the first client compute node, and wherein the one or more second transmission conditions comprise at least one of available bandwidth or latency associated with transmitting from the first client compute node to the second client compute node.

8. The computer-implemented method of claim 5, wherein the video content is transmitted based, at least in part, on the one or more first transmission conditions by setting at least one of an encoding bitrate and an applied proportion of forward error correction for the transmission of the video content to the first client compute node based, at least in part, on the first transmission conditions.

9. The computer-implemented method of claim 8, further comprising:
receiving, from the second client compute node, user input associated with the video content; and
transmitting the user input to the server compute node.

10. The computer-implemented method of claim 9, further comprising:
pre-processing, by the first client compute node, the user input prior to transmitting the user input to the server compute node.

11. The computer-implemented method of claim 9, wherein the user input is provided to the second client compute node using a soft controller interface.

12. The computer-implemented method of claim 5, wherein the video content comprises a portion of a video game.

13. One or more non-transitory computer-readable storage media having stored thereon instructions that, upon execution on a first client compute node, cause the first client compute node to perform operations comprising:
receiving video content transmitted based, at least in part, on one or more first transmission conditions associated with a transmission of the video content from a server compute node to the first client compute node, wherein the server compute node encodes the video content;
decoding the video content;
identifying one or more second transmission conditions associated with a transmission of the video content from the first client compute node to a second client compute node;
re-encoding the video content for transmission to the second client compute node, wherein the video content is re-encoded using a different encoding bitrate than was used for the transmission of the video content from the server compute node to the first client compute node, wherein the different encoding bitrate used for re-encoding is set based on the one or more second transmission conditions, and wherein a different proportion of forward error correction is applied to transmit the video content to the second client compute node than is used to transmit the video content to the first client compute node, the different proportion of forward error correction determined based at least in part on one or more loss rates associated with transmitting to the second client compute node, the one or more loss rates included in the one or more second transmission conditions;
transmitting the video content to the second client compute node based, at least in part, on the one or more second transmission conditions;
estimating, based at least in part on the one or more second transmission conditions, a time that it will take to transmit the video content to the second client compute node; and
presenting, by the first client compute node, the video content based at least in part on the estimated time.

14. The one or more non-transitory computer-readable storage media of claim 13, wherein the one or more first transmission conditions comprise at least one of screen size, resolution, processor characteristics or memory characteristics of the first client compute node, and wherein the one or more second transmission conditions comprise at least one of screen size, resolution, processor characteristics or memory characteristics of the second client compute node.

15. The one or more non-transitory computer-readable storage media of claim 13, wherein the one or more first transmission conditions comprise at least one of available bandwidth, loss rates or latency associated with transmitting from the server compute node to the first client compute node, and wherein the one or more second transmission conditions comprise at least one of available bandwidth or latency associated with transmitting from the first client compute node to the second client compute node.

16. The one or more non-transitory computer-readable storage media of claim 13, wherein the video content is transmitted based, at least in part, on the one or more first transmission conditions by setting at least one of an encoding bitrate and an applied proportion of forward error correction for the transmission of the video content to the first client compute node based, at least in part, on the first transmission conditions.

17. The one or more non-transitory computer-readable storage media of claim 16, wherein the operations further comprise:

receiving, from the second client compute node, user input associated with the video content; and transmitting the user input to the server compute node.

18. The one or more non-transitory computer-readable storage media of claim 17, wherein the operations further comprise:

pre-processing, by the first client compute node, the user input prior to transmitting the user input to the server compute node.

19. The one or more non-transitory computer-readable storage media of claim 17, wherein the user input is provided to the second client compute node using a soft controller interface.

20. The one or more non-transitory computer-readable storage media of claim 13, wherein the video content comprises a portion of a video game.

* * * * *